United States Patent

Huber et al.

(10) Patent No.: US 8,669,220 B2
(45) Date of Patent: Mar. 11, 2014

(54) INJECTION MOULDED CONTAINERS

(75) Inventors: Andreas Huber, Vienna (AT); Markus Huber, Jagenbach (AT); Simone Huber, Vienna (AT); Jacobus Simon Petrus Van Diepen, Ludwigshafen (NL); Ralf Wiedemann, Mira (IT)

(73) Assignee: Reckitt Benckiser N.V., Hoofddorp (NL)

( * ) Notice: Subject to any disclaimer, the term of this patent is extended or adjusted under 35 U.S.C. 154(b) by 182 days.

(21) Appl. No.: 12/934,306

(22) PCT Filed: Apr. 1, 2009

(86) PCT No.: PCT/GB2009/000874
§ 371 (c)(1),
(2), (4) Date: Mar. 22, 2011

(87) PCT Pub. No.: WO2010/112793
PCT Pub. Date: Oct. 7, 2010

(65) Prior Publication Data
US 2011/0166056 A1    Jul. 7, 2011

(30) Foreign Application Priority Data

Apr. 1, 2008 (GB) .................................. 0805879.4

(51) Int. Cl.
*C11D 11/00* (2006.01)
*C11D 17/04* (2006.01)
*B29B 7/82* (2006.01)
*B29C 45/73* (2006.01)

(52) U.S. Cl.
USPC ........... 510/296; 510/220; 510/224; 510/439; 264/328.16

(58) Field of Classification Search
USPC .............. 510/296, 220, 224, 439; 264/328.16
See application file for complete search history.

(56) References Cited

U.S. PATENT DOCUMENTS

| 5,705,239 | A | 1/1998 | Andersen et al. |
| 6,228,825 | B1 * | 5/2001 | Gorlin et al. .................. 510/226 |
| 6,800,601 | B2 * | 10/2004 | Allan et al. .................... 510/447 |
| 2002/0162940 | A1 | 11/2002 | Frul et al. |
| 2004/0129597 | A1 * | 7/2004 | Fregonese et al. ......... 206/524.7 |
| 2006/0016715 | A1 * | 1/2006 | Fregonese et al. ......... 206/524.7 |
| 2007/0167340 | A1 * | 7/2007 | Barthel et al. ................ 510/220 |

FOREIGN PATENT DOCUMENTS

| EP | 1460107 A | 9/2004 |
| EP | 1849577 A | 10/2007 |
| GB | 1266560 A | 3/1972 |
| GB | 2370554 A | 7/2002 |
| JP | 7171868 A | 7/1995 |
| JP | 2003192884 A | 7/2003 |
| JP | 2005144702 A | 6/2005 |
| WO | 9308095 A1 | 4/1993 |
| WO | 9930892 A | 6/1999 |

OTHER PUBLICATIONS

English Language Abstract for JP2005144702 taken from esp@cenet.com.
English Language Abstract for JP7171868 taken from esp@cenet.com.
English Language Abstract for JP2003192884 taken from esp@cenet.com.

* cited by examiner

*Primary Examiner* — Lorna M Douyon
(74) *Attorney, Agent, or Firm* — Norris McLaughlin & Marcus PA

(57) ABSTRACT

A method of forming a water soluble container, comprising an injection moulded water soluble polymer, in which is present a fabric care, surface care or dishwashing composition, by injection moulding a thermoplastic material into a mould, wherein before or during the injection moulding process the mould is actively heated, the mould being at an elevated temperature, below the melting point of the thermoplastic material, throughout the injection moulding process.

19 Claims, No Drawings

INJECTION MOULDED CONTAINERS

This is an application filed under 35 USC 371 of PCT/GB2009/000874.

The present invention relates to a process for making water-soluble containers, in particular containers that may be utilised for the delivery into an aqueous environment of a fabric care, surface care or dishwashing composition.

Washing compositions may be delivered to a washing machine by a delivery tray or they may be placed directly into the machine. The compositions may be in powder, liquid or block form. Liquid and powder compositions have the disadvantage that they may be spilt. Powder compositions have the additional disadvantage that they may produce dust which can be inhaled. These problems are overcome or lessened when blocks of washing composition are used. These are normally individually wrapped. On unwrapping a block, for use, it is still possible that some dust may be produced. Additionally it is inconvenient for the consumer to unwrap the block. Furthermore it is almost impossible for the user to avoid some contact between the block and their skin, leading to a requirement for the user to wash their hands after starting the machine. All of the methods described involve a risk of contact between the composition and the skin, and it is desirable in all cases for the user to wash their hands after starting the washing machine. In this context it should be borne in mind that many compositions contain enzymes to assist the cleaning action. Even though the user may tolerate enzyme residues which may be left in clothes after washing, they may still not tolerate contact between the concentrated washing composition containing the enzymes, and the skin.

These considerations apply in areas including fabric care, surface care and dishwashing.

It is known to package chemical compositions which may be of a hazardous or irritant nature in water-soluble or water-dispersible materials such as films. The package can simply be added to water in order to dissolve or disperse the contents of the package into the water.

For example, WO 89/12587 discloses a package which comprises an envelope of a water-soluble/dispersible material which comprises a flexible wall and a water-soluble/dispersible heat seal. The package may contain an organic liquid such as a pesticide, fungicide, insecticide or herbicide. WO 93/08095 discloses water soluble packages comprising a toxic composition such as a pesticidal composition packaged in sheets of water soluble or water dispersible material.

CA-A-1,112,534 discloses a packet made of a water-soluble material in film form enclosing within it a paste of automatic dishwasher detergent composition. The water-soluble material may be, for example, poly(vinyl alcohol), polyethylene oxide or methyl cellulose.

It is also known to form water-soluble containers by thermoforming a water-soluble material. For example, WO 92/17382 discloses a package containing an agrochemical comprising a first sheet of non-planar water-soluble or water-dispersible material and a second sheet of water-soluble/dispersible material superposed on the first sheet and sealed to it by a water-soluble/dispersible seal.

The above methods of packaging have, however, a number of disadvantages.

The first disadvantage is that they do not have a particularly attractive appearance. In fields such as containers used in the domestic environment, an attractive appearance for an article is extremely desirable. Liquids contained in envelopes of water-soluble film can have a limp, unattractive appearance.

The second disadvantage is that it is difficult to form two or more separate compartments in the packaging so that two incompatible components are both enclosed but separated from each other. Although an arrangement has been described to separate incompatible materials in flexible pouches in WO 93/08095, the method proposed is complex and is not currently achievable in large-scale manufacturing. It cannot, therefore, be used for producing large numbers of containers.

The third disadvantage is that there is only limited control of the release profile of the compositions held in the containers. For example, when a composition is held between two planar water-soluble films or in a thermoformed package, the composition is simply released at the time when the films dissolve or disperse in water. While it may be possible to control to a certain extent the timing of the start of release of the contents, there can be no control over the rate of release of the contents since the entire film dissolves or disperses at about the same time. Additionally if the thermoforming is not carefully controlled there may be inadvertent thinning of the film material at the points where the material is drawn down into the mould when it is thermoformed. This could release the contents of the package early.

The fourth disadvantage is that the containers cannot be produced at a particularly fast rate. For containers produced by heat-sealing planar films or by thermoforming, the containers have to be immediately filled and sealed. All of these procedures have to be carried out in succession. This means that it is not possible to obtain a quick throughput for mass-market goods such as household products. For example, standard thermoforming machines can only produce around 400 to 800 containers per minute.

One way to overcome these disadvantages is to use injection moulding to form the water soluble container. The use of injection moulding facilitates the production of attractive, multi-compartment water soluble/dispersible containers, wherein the release profile of the compositions contained within each compartment may be altered individually. The use of injection moulding to form articles is well known, see for example JP07171868, GB1266560, US 2002/162940. The use of injection moulding facilitates the production of attractive articles easily and at low cost.

However, the use of injection moulding for forming containers is not without its own associated issues.

The water soluble materials used for forming the containers (e.g. polyvinyl alcohol, polyethylene oxide or methyl cellulose) have a high viscosity in a molten state. Thus the injection moulding pressure has to be high, meaning that the moulds and the moulding equipment have to be designed to be able to operate at such high pressures. The high pressure machinery is expensive and difficult to operate.

Furthermore, even at high injection pressure required, the flow properties of the container forming materials are still poor. Thus the moulds have to be shallow so that the pathway of the injected material is short. If the pathway of the injected material is too long, the finished container, when removed from the mould, can suffer with incomplete container walls. To counter this problem the flow pathways within the mould have to be wide to allow for sufficient material flow.

An additional problem with conventional (state of the art) injection moulding is that of thermal stressing of the container. The water soluble/dispersible material is typically injection moulded at a temperature above its melting point into a mould which is at room temperature or even lower. The sudden cooling on injection moulding has been found to create internal stresses within the container. These stresses can weaken the container and make it difficult to remove the container from the mould without causing damage. Thus most common removal methods require that only the rim of the moulded item is forced free of the mould to prevent disruption of the remainder of the item: if a force is applied to any other part of the moulded item, then often the rim portions of the items are damaged.

The present invention seeks to provide water-soluble containers which overcome some or all of the above disadvantages.

According to a first aspect of the present invention there is provided a method of forming a water soluble container, comprising an injection moulded water soluble polymer, in which is present a fabric care, surface care or dishwashing composition, by injection moulding a thermoplastic material into a mould, wherein for or during the injection moulding process the mould is actively heated, the mould being at an elevated temperature, below the melting point of the thermoplastic material, throughout the injection moulding process.

In accordance with a second aspect of the present invention there is provided a method of forming a water soluble container, comprising an injection moulded water soluble polymer, in which is present a fabric care, surface care or dishwashing composition, by injection moulding a thermoplastic material into a mould, wherein during the entire injection moulding process the mould is actively heated to an elevated constant temperature, below the melting point of the thermoplastic material.

The present invention further provides a method of ware washing, comprising use of a container, as produced in the method above, the method comprising introducing the container into a ware washing machine prior to commencement of the washing process, the container being entirely consumed during the washing process. The ware washing machine may, for example, be a dishwashing or laundry washing machine.

The term 'actively heated (or active heating)' as used herein shall mean heating with other sources of heat than the heat transferred by the molten thermoplastic material and the consequent heating of heated flow channels.

Active heating does not necessarily have to be supplied to the process for every moment of the process, though it could be. It could be supplied intermittently.

The term 'elevated temperature' as used herein most broadly denotes any temperature above ambient temperature, and more preferably a temperature above 40° C., most preferably above 50° C., such as above 60° C. or even above 70° C.

In accordance with the invention the mould should be at an elevated temperature throughout injection moulding process, though that elevated temperature may change as the process progresses. Preferably according to the first aspect of the invention and in accordance with the second aspect of the invention, however, the elevated temperature is substantially constant throughout the process. Substantially constant shall mean that the mould has a temperature of ±10° C., more preferably ±5° C., relative to the target temperature, throughout the method. Preferably, therefore the article is at an elevated temperature when removed from the mould, and cools to ambient temperature. Cooling could be passive—allowing the article to cool in still ambient air—or active, using cooled air or other cooling medium below ambient temperature (also called "chilling" herein) and/or using a flow of air or other cooling medium (which may itself be cooled, or at ambient temperature).

Preferably no active cooling of the mould is applied, such that the mould temperature would drop from a said elevated temperature before ejection of the article.

Surprisingly the method of the present invention has been found to overcome disadvantages normally associated with injection moulding.

Without wishing to be bound by theory it is proposed that in the heated injection moulding mould the flow properties of the injected polymer are improved. This has many beneficial effects. The flow pathways within the mould can be thinner and yet reliable wall formation is still achieved. This has the knock-on benefit that less material is required to form articles, with clear cost savings.

Furthermore it has been found that, in the method of the present invention, the flow passageways can be longer (as well as thinner) than those of the prior art. Thus the mould can be deeper, still with reliable wall formation.

The improved material flow in the mould may be used to reduce the injection pressure. This has an extra benefit that injection moulding machine wear is reduced/lower operating pressure injection moulding machinery may be used. Alternatively more viscous materials can be employed.

Additionally as the mould is heated the thermal shock experienced by the injection moulded material is reduced. Thus brittleness and damage is reduced. Also removal of the article from the mould has been found to be of reduced risk as the (typically still soft) parts display a decreased tendency to break and moreover following removal the formed article can be further manipulated to give it final shape.

Preferably the mould is heated to a temperature above the glass transition temperature of the material being injection moulded. Preferably the mould is heated to a temperature of at least 10° C. to 70° C. or 80° C. above the glass transition temperature (Tg) of the material being moulded, most preferably to at least 20° C. to 60° C. or 70° C. above Tg. Tg in this definition is determined by DSC (Differential Scanning calorimetry) using a Perkin Elmer DSC7 machine. A heating rate of 10° C./min was used. A sample is heated to above its melting point, allowed to cool well below its Tg, and heated again to above its melting point. Alternatively or additionally we may refer to standard test ASTM D 34/8, 1999 (heating rate of 10° C./min).

Preferably, the mould is heated to a temperature of at least 10° C. to 100° C. below the melting temperature of the thermoplastic material, most preferably to at least 20° C. to 80° below the melting temperature of the material being injection moulded.

It will be appreciated that the container may comprise any water-soluble thermoplastic polymer. The water-soluble polymer is preferably selected from poly(vinyl alcohol); a cellulose derivative (such as an ether or hydroxypropyl methyl cellulose); and poly(glycolide), poly(glycolic acid), poly(lactides), poly (lactic acid) or a copolymer thereof; polyvinylpyrrolidine, polyacrylic acid or an ester thereof, polymaleic acid or an ester thereof, or a copolymer of any thereof. Also preferred are interpolymers which comprise a blend of any of the above or in addition any other polymer that is also water-soluble.

Most preferably the water-soluble polymer comprises poly (vinyl alcohol).

For poly(vinyl alcohol) containing compositions the mould is preferably heated to 60 to 90° C.

The containers produced in the present invention are (after chilling) generally self-supporting, and have an attractive, uniform appearance which does not vary between different containers. In addition, a wide variety of different shapes and designs are available. Furthermore, the rigid containers can easily have various elements incorporated which are considered to be pleasing to the eye.

As the containers are self-supporting, it is easily possible to introduce two or more compartments, or have larger compartments separated by walls, to separate mutually incompatible ingredients. The containers can also hold part of the composition on an external surface, for example in an indentation. Furthermore, the container can be moulded in almost any shape that might be useful. In particular it can be given raised or lowered areas.

It is possible to control the release profile of the contents of the container. Since the container is rigid, it is possible to adapt the width of all of the walls of the container to control both the start of release of the composition as well as the rate of release. For example, one or more walls may be made thin in order to have an early release of the composition. Alternatively all the walls may be thick in order to ensure that there is a delayed release of the composition. The rate of release of the composition may also be controlled by ensuring that only part of the container has thin walls which are dissolved or dispersed before the remainder of the container. Different walls or parts of walls of the container may be prepared from different water-soluble polymers which have different dissolution characteristics. For example, a first compartment may be fully enclosed by a polymer which dissolves at a higher or lower temperature than the polymer enclosing a second compartment. Thus different components can be released at different times. If the container holds a solid or gelled composition, it is not even necessary for the container to fully enclose the composition. A part may be left exposed, so that it immediately begins to dissolve when added to water.

Since the containers are rigid and self-supporting, they can easily be filled on a production line using normal filling equipment. Such filling equipment is quite capable of filling at least 500 containers per minute.

The containers may provide added efficiency to the compositions contained therein by themselves being active in detergency (e.g. as a auxiliary function or source of active agent in the wash process such as fabric care, machine care, table ware care).

Desirably the container, apart from its contents, consists essentially of the injection-moulded polymer or polymers.

It is possible for suitable additives such as plasticizers and lubricants to be included. Plasticizers are generally used in an amount of up to 30 wt %, for example from 5 to 20 wt %, lubricants are generally used in an amount of 0.5 to 5 wt %. Fillers and other auxiliary materials may be present, and, where present generally in an amount of up to 30%. The polymer is generally therefore used in an amount of 60 to 95 wt %, more preferably 75 to 84.5 wt %, based on the total amount of the moulding composition.

The container is generally cold water (20° C.) soluble, but may be insoluble in cold water at 20° C. and only become soluble in warm water or hot water having a temperature of, for example, 30° C., 40° C., 50° C. or even 60° C.

For certain applications or uses, containers soluble in aqueous environments at temperatures as low as 5° C. are also desirable.

In order to ensure that the polymer is capable of being injection moulded, it is usual to incorporate components such as plasticizers and mould release agents in an amount of up to, for example, 30 wt % of the composition. Suitable plasticizers are, for example, pentaerthyritol such as depentaerythritol, sorbitol, mannitol, glycerine and glycols such as glycerol, ethylene glycol and polyethylene glycol. Solids such as talc, stearic acid, magnesium stearate, silicon dioxide, zinc stearate, and colloidal silica may also be used.

Poly(vinylpyrollidone) may be moulded at temperatures of from 120-180° C., depending upon the formulation selected and the melt flow index required.

Poly(acrylic acid) may be moulded at temperatures of from 180-220° C., for example, depending upon the formulation selected and the melt flow index required.

Poly(maleic acid) may be moulded at temperatures of, from 180-220° C. for example, depending upon the formulation selected and the melt flow index required.

PVOH, when used as a polymer in the container, may be moulded at temperatures of, for example, from 160-220° C., depending upon the formulation selected and the melt flow index required. A preferred PVOH which is already in a form suitable for injection moulding is sold in the form of pellets available from Nippon Goshei or Soltec Development SA of Paris, France. The PVOH preferably used to form the container of the present invention may be partially or fully alcoholised or hydrolysed. For example it may be from 75-99%, preferably 80-92%, more preferably 83-88%, alcoholised or hydrolysed polyvinylacetate.

Preferably the container is a container enclosing a washing composition.

All of the polymer compositions may also include other components such as colouring agents and components which modify their properties.

Injection moulding techniques are well known to the skilled person and are well described in the literature (see, for example a good summary is provided in "The Wiley Encyclopaedia of Packaging Technology" Wiley Interscience 1986).

The container generally comprises a water-soluble receptacle part which holds the composition and a water-soluble closure part, which may simply close the receptacle part or may itself have at least some receptacle function. The receptacle part preferably has side walls which terminate at their upper end in an outward flange in which the closure part is sealingly secured, especially if the closure part is in the form of a film. Ideally the closure part is joined to the receptacle part directly by means of a hinge part, preferably the receptacle, closure and hinge part are caste in a single mould. The securement may be by means of an adhesive but is preferably achieved by means of a seal, between the flange and the closure part. Preferably the receptacle part is connected to the closure part via a hinge part thus forming a single article which is easily sealed. Heat sealing may be used or other methods such as infra-red, radio frequency, ultrasonic, laser, solvent, vibration or spin welding. An adhesive such as an aqueous solution of PVOH or a cellulose ether may also be used. The seal is desirably also water-soluble.

The closure part may itself be injection moulded or blow moulded. Preferably, however, it is a plastics film secured over the receptacle part. The film may, for example, comprise PVOH or a cellulose ether such as HPMC or another water-soluble polymer. According to one embodiment of the invention it is preferred that the closure part comprises a poly(vinyl alcohol) film or injection-moulded rigid closure.

A preferred manufacturing process includes the following steps:
(i) plastification of material to be moulded in an injection unit by heating the material until molten;
(ii) injection of the material into the actively heated mould;
(iii) opening of the mould;
(iv) de-moulding of the container;
(v) allowing the container to cool, actively or passively (e.g. in a cooling area outside the mould);
(vi) charging the container with a washing composition; and
(vii) closing it by means of the closure part.

The article is suitably soft and pliant when removed from the mould, and its shape can then be changed by mechanical action, then cooled. Once cool, it may be less soft and pliant, i.e. more self-supporting. Its shape may be different from its shape on removal from the mould.

The container walls generally have thicknesses such that the containers are self-supporting. For example, the outside walls and any inside walls which have been injection moulded independently have a thickness of less than 1 mm, for example less than 754 µm, 504 µm, 304 µm, 200 µm or 150 µm. Preferably, the closure part is of a thinner material than the receptacle part. If different compartments having different dissolution times are required, different wall thicknesses can be used. A thickness difference of from 100 µm to 500 µm, preferably from 250 µm to 350 m, would give a suitable difference in release times.

Preferably, the closure part dissolves in water (at least to the extent of allowing the washing composition in the receptacle part to be dissolved by the water; and preferably completely) at 40° C. in less than 5 minutes, preferably in less than 2 minutes.

The receptacle part and the closure part could be of the same thickness or different thicknesses. The closure part may, for example, be of higher solubility than the receptacle part, in order to dissolve more quickly.

Preferably, the container is generally cuboid in its external shape, with the top wall being formed by the closure part, and with the side walls and base wall being formed by the receptacle part.

The container may be manufactured by forming an array of receptacle parts, each receptacle part being joined to adjacent receptacle parts, and being separable from them by a snap or tear action. The array is preferably one which has columns and rows of the receptacle parts. The receptacle parts may be separated by frangible webs of the water-soluble polymer such as PVOH or a cellulose ether.

Alternatively, the receptacle parts may be manufactured with the aforementioned flanges, such that they are separated from each other by a line of weakness. For example the material may be thinner, and so able to be broken or torn readily. The thinness may be a result of the moulding process or, preferably, of a later scoring step.

In the manufacturing method, the array, formed by injection moulding, is fed to a filling zone, and all the receptacle parts are charged with the washing composition. A sheet of a water-soluble polymer such as PVOH or a cellulose ether may then be secured over the top of the array, to form the closure parts for all the receptacle parts of the array. The array may then be split up into the individual washing capsules, prior to packaging, or it may be left as an array, for packaging, to be split by the user.

The container, capsule or receptacle part may define a single compartment. The container, capsule or receptacle part may define two or more compartments, which contain different products useful in a washing process. In such a situation a dividing wall or walls of the compartments preferably terminate at the top of the container, i.e. in the same plane as the top edges of the side walls, so that when the receptacle part is closed by the closure part the contents of the compartments cannot mix. The container may be provided with an upstand, preferably spaced from the side walls thereof, and preferably of generally cylindrical shape. If wished, the remaining volume of the container can be divided into two or more parts by means of walls extending between the upstand and the side walls.

The container may be formed with an opening, for example a depression, formed in the side wall or the base wall, and preferably being open in the outward direction. That is to say, it preferably does not form part of the main volume defined by the container. Preferably the opening is adapted to receive, in a press-fit manner, a solid block (for example a tablet) of a composition, for example a material useful in a washing process.

Preferably, the closure part is of a transparent or translucent material, so that the contents of the washing capsule can be seen.

Preferably, the container is of a transparent or translucent material, so that the contents of the washing capsule can be seen.

The washing composition within the container, or within a compartment thereof, need not be uniform. For example during manufacture it could be fed first with a settable agent, for example a gel, useful in a washing process, and then with a different material. The first material could dissolve slowly in the washing process so as to deliver its charge over a long period within the washing process.

This might be useful, for example, to provide immediate, delayed or sustained delivery of a softening agent in a clothes washing container.

In all embodiments of the present invention one compartment may contain, for example, a liquid or solid component (such as a powder, granules or a compressed or gelled tablet) and another may contain a different liquid or solid component (such as a powder, granules or a compressed or gelled tablet). Alternatively, more than one component may be present in one or more compartments. For example a compartment may contain a solid component, for example in the form of a ball or pill (such as a powder, granules or a compressed or gelled tablet), and a liquid component.

Desirably the composition has a mass of at least 10 g or 15 g, for example, from 10 g or 15 g to 100 g, especially from 10 g to 15 g to 40 g. For example, a dishwashing composition may weigh from 10 g or 15 g to 20 g, a water-softening composition may weigh from 25 g to 35 g, and a laundry composition may weigh from 10 g to 40 g, 20 g to 40 g or 30 g to 40 g.

In general the maximum dimension of the container is 5 cm. For example, a cuboid container may have a length of 1 to 5 cm, especially 3.5 to 4.5 cm, a width of 1.5 to 3.5 cm, especially 2 to 3 cm, and a height of 1 to 2 cm, especially 1.25 to 1.75 cm.

The composition may comprise a powder, gel, paste or low water liquid foundation.

The composition contained by the container may be, for example, any which is suitable for the designated application, for example a clothes washing or dishwashing application. It may be a powder or a liquid but if a liquid, may be a low water formulation, preferably having a maximum water content of 5 wt %, in order to maintain the integrity of the walls of the capsule or a higher water formulation containing, for example, at least 8 wt % water.

It will be appreciated that higher water contents may be present where the water is chemically or physically bound. The composition may be formulated having regard to the fact that the user will not come into contact with the composition, whether by inhalation or by skin contact. For example, the composition may include an enzyme, without concern about physical contact between the composition containing the enzyme, and the user.

If the container contains an aqueous liquid having a relatively high free water content, it may be necessary to take steps to ensure the liquid does not attack the water-soluble polymer if it is soluble in cold water (20° C.), or water at a temperature of up to, say, 35° C. Steps may be taken to treat the inside surfaces of the container, for example by coating it with agents such as PVdC (poly(vinylidene chloride))or PTFE (polytetrafluoroethylene), or to adapt the composition to ensure that it does not dissolve the polymer. For example, it has been found that ensuring the composition has a high ionic strength or contains an agent which minimises water loss through the walls of the container will prevent the composition from dissolving the polymer from the inside. This is described in more detail in EP-A-518,689 and WO 97/27743.

The ingredients of the composition depend on the use of the composition. Thus, for example, the composition may contain a surface active agents such as an anionic, nonionic, cationic, amphoteric or zwitterionic surface active agents or a mixture thereof.

In laundry applications anionic surfactants are preferred.

Examples of anionic surfactants are straight-chained or branched alkyl sulfates and alkyl polyalkoxylated sulfates, also known as alkyl ether sulfates. Such surfactants may be produced by the sulfation of higher $C_8$-$C_{20}$ fatty alcohols.

Examples of primary alkyl sulfate surfactants are those of formula:

$$ROSO_3^-M^+$$

wherein R is a linear $C_8$-$C_{20}$ hydrocarbyl group and M is a water-solubilising cation. Preferably R is $C_{10}$-$C_{16}$ alkyl, for example $C_{12}$-$C_{14}$, and M is alkali metal such as lithium, sodium or potassium.

Examples of secondary alkyl sulfate surfactants are those which have the sulfate moiety on a "backbone" of the molecule, for example those of formula:

$$CH_2(CH_2)_n(CHOSO_3^-M^+)(CH_2)_mCH_3$$

wherein m and n are independently 2 or more, the sum of m+n typically being 6 to 20, for example 9 to 15, and M is a water-solubilising cation such as lithium, sodium or potassium.

Especially preferred secondary alkyl sulfates are the (2,3) alkyl sulfate surfactants of formulae:

$$CH_2(CH_2)_x(CHOSO_3^-M^+)CH_3$$

and $$CH_3(CH_2)_x(CHOSO_3^-M^+)CH_3$$

for the 2-sulfate and 3-sulfate, respectively. In these formulae x is at least 4, for example 6 to 20, preferably 10 to 16. M is cation, such as an alkali metal, for example lithium, sodium or potassium.

Examples of alkoxylated alkyl sulfates are ethoxylated alkyl sulfates of the formula:

$$RO(C_2H_4O)_nSO_3^-M^+$$

wherein R is a $C_8$-$C_{20}$ alkyl group, preferably $C_{10}$-$C_{18}$ such as a $C_{12}$-$C_{16}$, n is at least 1, for example from 1 to 20, preferably 1 to 15, especially 1 to 6, and M is a salt-forming cation such as lithium, sodium, potassium, ammonium, alkylammonium or alkanolammonium. These compounds can provide especially desirable fabric cleaning performance benefits when used in combination with alkyl sulfates.

The alkyl sulfates and alkyl ether sulfates will generally be used in the form of mixtures comprising varying alkyl chain lengths and, if present, varying degrees of alkoxylation.

Other anionic surfactants which may be employed are salts of fatty acids, for example $C_8$-$C_{18}$ fatty acids, especially the sodium, potassium or alkanolammonium salts, and alkyl, for example $C_8$-$C_{18}$, benzene sulfonates.

In automatic dishwashing applications non-ionic surfactants are preferred especially those which have low foaming characteristics.

Examples of nonionic surfactants are fatty acid/fatty alcohol alkoxylates, such as fatty acid ethoxylates, especially those of formula:

$$R(C_2H_4O)_nOH$$

wherein R is a straight or branched $C_8$-$C_{16}$ alkyl group, preferably a $C_9$-$C_{15}$, for example $C_{10}$-$C_{14}$ or $C_{12}$-$C_{14}$, alkyl group and n is at least 1, for example from 1 to 16, preferably 2 to 12, more preferably 3 to 10.

The alkoxylated fatty alcohol nonionic surfactant will frequently have a hydrophilic-lipophilic balance (HLB) which ranges from 3 to 17, more preferably from 6 to 15, most preferably from 10 to 15.

Examples of fatty alcohol ethoxylates are those made from alcohols of 12 to 15 carbon atoms and which contain about moles of ethylene oxide. Such materials are commercially marketed under the trademarks Neodol® 25-7 and Neodol® 23-6.5 by Shell Chemical Company. Other useful Neodols include Neodol® 1-5, an ethoxylated fatty alcohol averaging 11 carbon atoms in its alkyl chain with about 5 moles of ethylene oxide; Neodol® 23-9, an ethoxylated primary $C_{12}$-$C_{13}$ alcohol having about 9 moles of ethylene oxide; and Neodol® 91-10, an ethoxylated $C_9$-$C_{11}$ primary alcohol having about 10 moles of ethylene oxide.

Alcohol ethoxylates of this type have also been marketed by Shell Chemical Company under the Dobanol® trademark. Dobanol 91-5 is an ethoxylated $C_9$-$C_{11}$ fatty alcohol with an average of 5 moles ethylene oxide and Dobanol 25-7 is an ethoxylated $C_{12}$-$C_{15}$ fatty alcohol with an average of 7 moles of ethylene oxide per mole of fatty alcohol.

Other examples of suitable ethoxylated alcohol nonionic surfactants include Tergitol® 15-S-7 and Tergitol® 15-S-9, both of which are linear secondary alcohol ethoxylates available from Union Carbide Corporation. Tergitol 15-S-7 is a mixed ethoxylated product of a $C_{11}$-$C_{15}$ linear secondary alkanol with 7 moles of ethylene oxide and Tergitol 15-S-9 is the same but with 9 moles of ethylene oxide.

Other suitable alcohol ethoxylated nonionic surfactants are Neodol® 45-11, which is a similar ethylene oxide condensation products of a fatty alcohol having 14-15 carbon atoms and the number of ethylene oxide groups per mole being about 11. Such products are also available from Shell Chemical Company.

Further nonionic surfactants are, for example, $C_{10}$-$C_{18}$ alkyl polyglycosides, such as $C_{12}$-$C_{16}$ alkyl polyglycosides, especially the polyglucosides. These are especially useful when high foaming compositions are desired. Further surfactants are polyhydroxy fatty acid amides, such as $C_{10}$-$C_{18}$N-(3-methoxypropyl) glycamides and ethylene oxide-propylene oxide block polymers of the Pluronic® type.

Examples of cationic surfactants are those of the quaternary ammonium type.

Examples of amphoteric surfactants are $C_{10}$-$C_{18}$ amine oxides and the $C_{12}$-$C_{18}$ betaines and sulfobetaines.

The total content of surfactants in a laundry or detergent composition is desirably 20 to 95 wt %, especially 30 to 90 wt %. Desirably, especially in a laundry composition, an anionic surfactant is present in an amount of 50 to 75 wt %, a nonionic surfactant is present in an amount of 5 to 20 wt %, a cationic surfactant is present in an amount of from 0 to 10 wt % and/or an amphoteric surfactant is present in an amount of from 0 to 10 wt %. Desirably in an automatic dishwashing composition, the anionic surfactant is present in an amount of from 0.1 to 5%, a non-ionic surfactant is present in an amount of 0.5 to 20 wt % and/or a cationic surfactant is present in an amount of from 0.1 to 5 wt %. These amounts are based on the total solids content of the composition, i.e. excluding any water which may be present.

Automatic dishwashing compositions and laundry compositions usually comprise a detergency builder. Suitable builders are alkali metal or ammonium phosphates, polyphosphates, phosphonates, polyphosphonates, carbonates, bicarbonates, borates, polyhydroxysulfonates, polyacetates, carboxylates and polycarboxylates such as citrates. The builder is desirably present in an amount of up to 90 wt % preferably 15 to 90 wt %. More preferably 15 to 75 wt %, relative to the total content of the composition. Further details of suitable components are given in, for example, EP-A-694,059, EP-A-518,720 and WO 99/06522.

The compositions, particularly when used as automatic dishwashing/laundry washing compositions, may also comprise enzymes, such as protease, lipase, amylase, cellulase and peroxidase enzymes. Such enzymes are commercially available and sold, for example, under the registered trade marks Esperase, Alcalase, Savinase, Termamyl, Lipolase and Celluzyme by Novozymes. Desirably the enzymes are present in the composition in an amount of from 0.05 to 1 wt %, especially 0.1 to 0.6 wt % based on the weight of active.

The compositions may, if desired, comprise a thickening agent or gelling agent. Suitable thickeners are polyacrylate polymers such as those sold under the trade mark CARBOPOL®, or the trade mark ACUSOL® by Rohm and Haas Company. Other suitable thickeners are xanthan gums. The thickener, if present, is generally present in an amount of from 0.2 to 4 wt %, especially 0.5 to 2 wt %.

The compositions can also optionally comprise one or more additional ingredients. These include conventional detergent composition components such as further surfactants, bleaches, bleach enhancing agents, builders, suds boosters or suds suppressors, anti-tarnish and anti-corrosion agents, organic solvents, co-solvents, phase stabilisers, emulsifying agents, preservatives, soil suspending agents, soil release agents, germicides, phosphates/phosphonates, pH adjusting agents or buffers, non-builder alkalinity sources, chelating agents, clays such as smectite clays, enzyme stabilizers, anti-limescale agents, colourants, dyes, hydrotropes, dye transfer inhibiting agents, brighteners and perfumes. If used, such optional ingredients will generally constitute no more than 20 wt %, for example from 1 to 10 wt %, of the total weight of the compositions.

Suitable co-builders are polymers and copolymers known to have builder properties. For example, such materials include appropriate polyacrylic acid, polymaleic acid, and polyacrylic/polymaleic and copolymers and their salts, such as those sold by BASF under the trade mark Sokalan®. Co-builders may be used in amount up to 30% of the composition.

Compositions which comprise an enzyme may optionally contain materials which maintain the stability of the enzyme. Such enzyme stabilizers include, for example, polyols such as propylene glycol, boric acid and borax. Combinations of these enzyme stabilizers may also be employed. If utilized, the enzyme stabilizers generally constitute from 0.1 to 1 wt % of the compositions.

The compositions may optionally comprise materials which serve as phase stabilizers and/or co-solvents. Example are $C_1$-$C_3$ alcohols or diols such as methanol, ethanol, propanol and 1,2-propanediol. $C_1$-$C_3$ alkanolamines such as mono-, di- and triethanolamines and monoisopropanolamine can also be used, by themselves or in combination with the alcohols. The phase stabilizers and for co-solvents can, for example, constitute 0.1 to 1 wt %, preferably 0.1 to 0.5 wt %, of the composition.

If the composition is in liquid form, it may be anhydrous, or, for example, contain up to 5 wt % water. Aqueous compositions generally contain greater than 8 wt % water based on the weight of the aqueous composition. Desirably the aqueous compositions contain more than 10 wt %, 15 wt %, 20 wt %, 25 wt % or 30 wt % water, but desirably less than 80 wt % water, more desirably less than 70 wt %, 60 wt %, 50 wt % or 40 wt % water. They may, for example, contain from 30 to 55 or 65 wt % water.

The compositions may optionally comprise components which adjust or maintain the pH of the compositions at optimum levels. Examples of pH adjusting agents are NaOH and citric acid. The pH may be from, for example, 1 to 13, such as 8 to 11 depending on the nature of the composition. For example, a dishwashing composition desirably has a pH of 8 to 11, a laundry composition desirably has a pH of 7 to 9, and a water-softening composition desirably has a pH of 7 to 9.

The above examples may be used for dish or fabric washing. In particular dish washing formulations are preferred which are adapted to be used in automatic dish washing machines. Due to their specific requirements specialised formulation is required and these are illustrated below.

Amounts of the ingredients can vary within wide ranges, however preferred automatic dishwashing detergent compositions herein (which typically have a 1% aqueous solution pH of above 8, more preferably from 9.5 to 12, most preferably from 9.5 to 10.5) are those wherein there is present: preferably from 5% to 90%, preferably from 5% to 75%, of builder; preferably from 0.1% to 40%, preferably from 0.5% to 30%, of bleaching agent; preferably from 0.1% to 15%, preferably from 0.2% to 10%, of the surfactant system; preferably from 0.0001% to 1%, preferably from 0.001% to 0.05%, of a metal-containing bleach catalyst; and preferably from 0.1% to 40%, preferably from 0.1% to 20% of a water-soluble silicate. Such fully-formulated embodiments typically further comprise from 0.1% to 15% of a polymeric dispersant, preferably from 0.01% to 10% of a chelant, and preferably from 0.00001% to 2% of a detersive enzyme, though further additional or adjunct ingredients may be present. Detergent compositions herein in granular form typically limit water content, for example to less than 7% free water, for better storage stability.

The invention is now further described with reference to the following non-limiting Example.

EXAMPLE

A PVOH resin (Tg=50-55° C., Tm=160-170° C.) is heated to 180° C. and is injected into a mould to form a multi-compartment container with internal dividing walls. The experiment was done on a Battenfeld injection moulding machine, heating was set to 185° C. in the last heating element, hot channels into the mould were set to 190° C., the highest hydraulic pressure of the machine throughout injection was measured to be 700 bar. The mould itself is heated to 75° C. and maintained at about this temperature throughout the injection moulding process. The container is removed from the mould after 12 seconds and is placed to chill to room temperature.

This process was repeated one thousand times to give one thousand containers.

No containers showed any breakages/incomplete walls.

Following cooling the parts were filled with good excellent shape retention.

Comparative Example

A PVOH resin (Tg=50-55° C., Tm=160-170° C.) is heated to 180° C. and is injected into a mould to form a multi-compartment container with internal dividing walls. The experiment was done on a Battenfeld injection moulding machine, heating was set to 185° C. in the last heating element, hot channels into the mould were set to 190° C., the highest hydraulic pressure of the machine throughout injection was measured to be 700 bar. The mould itself is at room temperature (25° C.) and maintained at about this temperature throughout the injection moulding process. The container is removed from the mould after 12 seconds and is placed to chill to room temperature.

This process was repeated one thousand times to give one thousand containers.

In contrast to the container produced in accordance with the method of the present invention it was found that container produced in accordance with this comparative example sticks tightly to the mould and is difficult to de-mould.

2% of the 1000 containers showed breakages. 15% had incomplete walls.

The invention claimed is:

1. A method of forming a water soluble container by an injection moulding process, the container comprising an injection moulded water soluble polymer, in which is present a fabric care composition, a surface care composition, or a dishwashing composition, wherein the method comprises the steps of; injecting a thermoplastic material into a mould, wherein the mould is actively heated, the mould being at an elevated temperature, below the melting point of the thermoplastic material, but above the glass transition temperature of the thermoplastic material, throughout the injection moulding process; and charging the water soluble container with the composition.

2. A method according to claim 1, wherein the container comprises a water-soluble polymer selected from poly(vinyl alcohol); a cellulose derivative; and poly(glycolide), poly (glycolic acid), poly(lactides), poly (lactic acid) or a copolymer thereof; polyvinylpyrrolidine, polyacrylic acid or an ester thereof, polymaleic acid or an ester thereof, or a copolymer of any of the foregoing thereof.

3. A method according to claim 1, wherein the container has two or more compartments.

4. A method according to claim 1, wherein the container is made from a water-soluble receptacle part and is sealed by a water-soluble closure part.

5. A method according to claim 4, wherein the closure part comprises a poly(vinyl alcohol) film or injection-moulded rigid closure.

6. A method according to claim 4, wherein the receptacle part has side walls which terminate at their upper end in an outward flange, to which the closure part is sealingly secured.

7. A method according to claim 1, wherein the composition comprises a powder, gel, paste or low water liquid formulation.

8. A method according to claim 1, wherein the container comprises a tablet formulated for delayed and/or sustained release of a material.

9. A method according to claim 4, wherein the receptacle part comprises an upstanding wall which separates compartments thereof 10. A method according to claim 3, wherein a first compartment dissolves in water at a different rate than a second compartment.

11. A method according to claim 4, wherein the receptacle part comprises an outwardly facing opening into which a tablet is press-fitted.

12. A method according to claim 4, wherein the closure part is of a transparent or translucent material.

13. A method according to claim 1, wherein said active heating is carried out during the entire injection moulding process in which the mould is at an elevated constant temperature.

14. A method according to claim 1, which further comprises
plastification of the thermoplastic material to be moulded in an injection unit by heating the material until molten before injection of the material into the mould;
de-moulding of the container;
allowing the container to chill; and
closing the container after charging the container with the composition.

15. A method according to claim 14, wherein the demoulding step is performed when the container is in a visco-elastic state.

16. A method according to claim 14, wherein following demoulding and prior to or during the chililng step force is applied to change the shape of the article.

17. A method according to claim 1 wherein the walls of the container have a thickness of less than 1 mm.

18. A method according to claim 1, wherein the container comprises poly(vinyl alcohol) or a copolymer thereof.

19. A method according to claim 1, wherein the container comprises poly(vinyl alcohol).

* * * * *